SKEW SERVO FOR MULTIPLE CHANNEL RECORDING SYSTEM

Filed Feb. 13, 1956 3 Sheets-Sheet 1

INVENTORS:
SAMUEL M. GARBER JR.,
THOMAS T. TRUE,
BENJAMIN G. WALKER,
BY George V. Eltgroth
THEIR ATTORNEY.

SKEW SERVO FOR MULTIPLE CHANNEL RECORDING SYSTEM

Filed Feb. 13, 1956 3 Sheets-Sheet 2

INVENTORS:
SAMUEL M. GARBER JR.
THOMAS T. TRUE,
BENJAMIN G. WALKER,

BY George V. Eltgroth
THEIR ATTORNEY.

May 17, 1960 S. M. GARBER, JR., ET AL 2,937,239

SKEW SERVO FOR MULTIPLE CHANNEL RECORDING SYSTEM

Filed Feb. 13, 1956 3 Sheets-Sheet 3

INVENTORS:
SAMUEL M. GARBER JR.,
THOMAS T. TRUE,
BENJAMIN G. WALKER,

BY George Rettaloth
THEIR ATTORNEY.

2,937,239

SKEW SERVO FOR MULTIPLE CHANNEL RECORDING SYSTEM

Samuel M. Garber, Jr., Syracuse, and Benjamin G. Walker and Thomas T. True, North Syracuse, N.Y., assignors to General Electric Company, a corporation of New York Application February 13, 1956, Serial No. 565,062
12 Claims. (Cl. 179—100.2)

This invention relates to multiple channel recording and reproduction and more particularly to the reduction of skew produced degradation of the performance of systems of this character.

The invention may, for example, be utilized in systems capable of recording video signals on magnetic tape and reproducing them with reasonable fidelity. Such systems have many applications. The recording of television broadcasts, radar data, and telemetering signals are examples. Since it is difficult to achieve the four or five megacycles bandwidth required for recording most signals in a single recorded track on magnetic tape, multiplexing methods have been developed in which the broadband video signal is broken down into several narrow band signals which can be recorded individually on parallel tracks of magnetic tape. Undistorted reproduction of the original video signal by a demultiplexing device requires that the signals produced by the playback head from the parallel tracks have precisely the same time relation to each other as that existing in the original signals before recording. The skew, or angular change in positional relationship of the tape to the head in conventional recording and reproducing systems introduces an equivalent time or phase error between the signals reproduced from the various tracks which far exceeds the limits of error tolerance inherent in such broadband multiplexing and demultiplexing systems.

Other applications in which signals from a plurality of parallel tracks must be reproduced in precisely the same time relationship in which they were recorded within tolerances of the order of tenths or hundredths of microseconds occur in the computing arts. It is frequently necessary to store digital pulse information or information in the form of several time varying functions for later operations the accuracy of which depend upon the precise phase relationship between the functions or information stored on the parallel tracks. For example, in an analog computer it is frequently necessary to introduce one or more arbitrary non-linear or forcing functions into a problem. Where such functions can not be conveniently generated internally by the computer, or where they result from externally observed data, they can be conveniently tape recorded and reproduced at will. The accuracy of time relationship between a plurality of these recorded functions is in many instances a major factor in the accuracy of the solution which can be obtained to the problem.

If any of the data or functions to be recorded for computer use are represented by broadband or video signals, the multiplexing techniques mentioned above can, of course, be applied to one or more of them as needed. In this event a carefully limited skew error is essential to undistorted reproduction of any multiplexed data as well as to accuracy of relationship between separate sources of data.

It is a primary object of this invention to provide means for reducing the relative skew between the transducing head and recording medium of an aperture type recorder and consequently to reduce the error in phase relationship between the outputs from a plural channel recording system.

It is a more specific object of this invention to provide a servo mechanism to control the head position in a recorder in accordance with the skew of the recording medium in relation to the head.

Briefly stated, in accordance with one aspect of the invention, a magnetic tape is provided with a plurality of parallel recording tracks. At least two of the tracks, preferably those at the edges of the tape, have reference signals recorded thereon. These signals may, for example, be of the same constant frequency and can be recorded at the same time that information signals are recorded on the remainder of the tracks. When the tape is played back, the reference signals will be reproduced with the same phase relationship which obtained when they were recorded only if the angular relationship or alignment between the tape and head is the same during playback as it was during recording. The occurrence of tape skew will cause a phase shift between the reference signals. Hence, if the two reference signals are applied to a phase detector which has an output proportional to the phase shift between them, this output may be used as an error signal to actuate the servo playback head drive in such a manner as to tend to reduce the error signal and hence to reduce the phase shift to zero. To the extent that the skew is linear across the tape, as is most frequently the case, the positional correction derived from the two reference signal tracks assures that the signals from all other information tracks will be played back in the same phase relationship in which they were recorded.

While the novel and distinctive features of the invention are particularly pointed out in the appended claims, a more expository treatment of the invention, in principle and detail, together with additional objects and advantages thereof, is afforded by the following description and accompanying drawings of a representative embodiment of the invention in which:

Figure 1A:
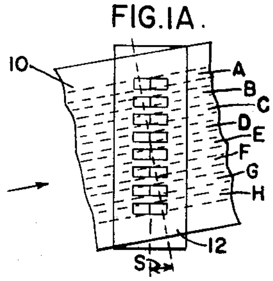
Figures 1A and 1B are diagrammatic plan views illustrating the nature of the skew relationship which occurs between the tape and the head.
Figure 1B:
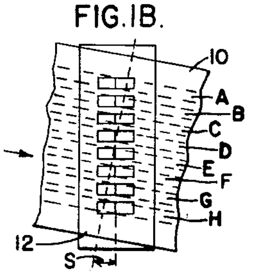
Figure 1C:
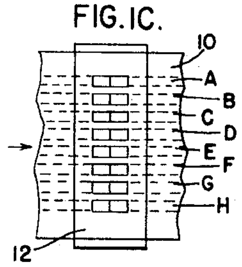
Figure 1C is a diagrammatic plan view illustrating the desired correct alignment of the tape and head.

Turning now to the drawings, Figures 1A, 1B, and 1C show a recording or storage medium 10 passing in front of a transducing head 12. It is to be understood that the term "transducing head" is used to indicate that the head may be a recording head or a playback head or it may be a single head connected in a conventional manner so as to perform both recording and playback functions. The recording medium may, for example, be a magnetic tape or it could be a suitable ferroelectric or other material. The medium 10 has a plurality of recording tracks or channels thereon. Eight such channels, A through H, have been shown for purposes of illustration, but it will of course be realized that any suitable number of channels could be used. Head 12 has one transducing element or channel for each of the tape tracks. In the case of a magnetic recorder, the individual transducing element may consist of wound toroids which are split at the point of tape contact to form an aperture or gap across which a variable magnetic field is established in a manner well known in the art. If a ferroelectric recording material is used, a suitable means for establishing an electric field across the gap would of course also be used. The transducing elements in any type of head are separated from each other by shielding to prevent inter-channel cross talk and are unitarily assembled to form a plural channel head as indicated at 12.

The tape 10 is fed past the head 12 from any suitable tape guides or rollers which are not shown. Even with the most careful construction of such guides or rollers, however, it is found that the tape does not always maintain the same angular relationship to the head in passing over it. Due to various mechanical factors, the tape will tend to rotate slightly in the plane of the head so that at any given instant it may be passing the head at a skew angle as shown in exaggerated fashion in Figures 1A and 1B rather than in perfect alignment as shown in Figure 1C.

It is obvious that if the tape is skewed as shown in Figures 1A or 1B during playback, and if the head remains fixed in position, signals which were recorded on the various tracks while the tape was in alignment as shown in Figure 1C will not be played back in the same phase relationship to each other in which they were recorded. In fact signals on any two tracks will be displaced from the relative position in which they were recorded by a distance along the tape approximately equal to the tangent of the angle of skew, S times the sum of the distances taken along the dashed line normal to the parallel sides of the tape from the apex of the angle S to the two tracks being considered. The equivalent time displacement in playback is of course given by this displacement distance divided by the velocity of the tape. To minimize this displacement two or more of the tape tracks, preferably the two outer tracks A and H, are used to record reference signals while information is being simultaneously recorded on the rest of the tracks B, C, D, E, F, and G. The reference signals may conveniently be sine waves of the same frequency and 90° phase difference when recorded. The phase relation between these reference signals in effect provides a record of the angular relationship or skew which existed between the tape and head when the reference signals and the information signals were simultaneously recorded.

Figure 2:
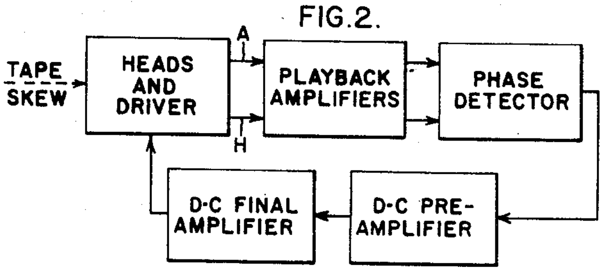
Figure 2 is a block diagram of the servomechanism loop.
Figures 3A, 3B:
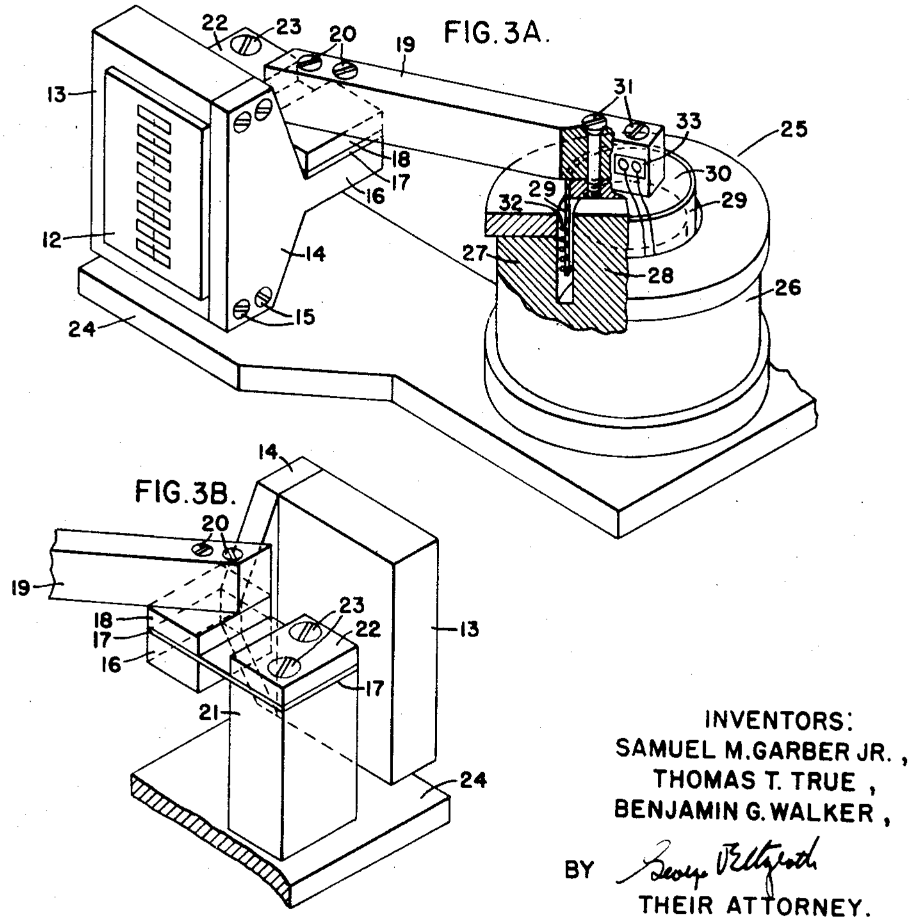
Figure 3A is a front perspective view, partly in section, of the head and driver assembly.
Figure 3B is a rear perspective view showing the spring support by which the head is pivotally mounted.

When the tape is played back a different skew may occur and affect the input to the heads as indicated in Figure 2. The recorded reference signals from tracks A and H, however, provide a record of the desired angular relationship which was obtained when all of the signals were recorded. In order to produce all of the signals in correct phase relation as recorded, it is only necessary to reproduce this original angular relationship regardless of what in fact it may have been. This is accomplished by feeding the reference signals picked up by the head from tracks A and H through playback amplifiers and applying them to a phase detector shown in Figure 2 and to be described in detail below in connection with Figure 4. The output of the phase detector is of the same polarity as and is linearly proportional in amplitude to the amount by which the phase of the inputs deviates from the original 90° relationship. The output of the phase detector is then amplified and applied as an error signal to a head driver or servo motor, shown in Figure 3A, which is connected by a mechanical linkage as shown in Figure 3B to the head in such a manner as to rotate the head in the plane of the tape about a pivot point at the center of the head. This action tends to restore the original angular relationship between the tape and head and hence to restore the phase relation between the signals from tracks A and H to the original 90° relation, thus causing all other signals to be reproduced in the correct phase. Although actual tape skew motion relative to the guides is not eliminated, a pivotally mounted head is caused to follow the tape motion in such a manner that the correct angular relationship or alignment between the tape and head shown in Figure 1C will be more nearly maintained.

In principle, the loop shown in block diagram in Figure 2 functions as a position servo mechanism to maintain the tape and head in alignment. In practice, of course, the system components shown in Figure 2 must be designed so as to meet the conditions of stability necessary to the design of any servomechanism as well as to meet the conditions of frequency response made necessary by the particular recorder and tape transport being used. The linearity of the phase detector output, for example, contributes to the stability of the loop. The skew correction obtained depends upon the assumption that the skew is linear across the tape, that is, that the tape is not deformed but only rotated. In a plural channel recorder using commercially available tapes this assumption has been experimentally verified.

In the preferred embodiment outlined above the reference signals are recorded on the two outer tape tracks at the same time the information signals are recorded on the rest of the tracks. Various modifications of this arrangement are obviously possible. The reference signals could, for example, be pre-recorded on the tape so that the servo could be used to cause the head to follow the tape both while the information signals were being recorded and while they were being played back. In either arrangement the reference signals could be recorded on tracks other than the outer tracks and, more particularly, more than two reference tracks could be used. Thus by suitable choice of track location, skew across any desired portion or portions of the tape can be measured and applied to any suitable circuitry to derive a plurality of signals or a composite signal representing any aspect of the skew or representing the total skew respectively. Furthermore, the basic principle of servo control of a transducing head by signals recorded in a few of the channels of a plural channel system is not limited to tape systems but could obviously be applied with suitable modifications of the mechanism to any type of aperture recording or storage system.

In some systems it may also be more convenient to have the transducing element fixed in position and apply the servo control to the angular motion of the storage medium since the critical factor is the relative alignment or angular relationship of the transducing element and the storage medium rather than the absolute motion of either.

In the embodiment illustrated in detail however, the plural channel tape 10 is preferably a magnetic tape which is caused to pass over the transducing head 12 as noted above. As may be seen in Figure 3A the plural channel head 12 is mounted in a frame member 13 and is secured in place by means of a side member 14 which may be attached to the frame member as by screws 15. Side member 14 has an arm 16 projecting backward therefrom. A flat spring 17, a block 18, and linkage member 19 are attached to the arm 16 as by screws 20. Spring 17 is also attached by means of block 22 and screws 23 to a supporting post 21 which is in turn attached to or may be integrally cast with base 24. The head 12 is thus pivotally mounted on base 24 by means of supporting post 21, spring hinge 17 and arm 16. Any suitable conventional connections (not shown) may be made for electrical inputs and outputs of the transducing elements of the various channels of head 12, it being only necessary to insure that the connections do not interfere with the free motion of the head.

As linkage member 19 is moved up and down by the servo motor 25, spring 17 flexes and acts as a hinge so that head 12 pivots about an axis of rotation perpendicular to the front face of head 12 and passing through the center of spring 17. In practice the gap between blocks 18 and 22 is smaller than shown for clarity of illustration in the drawing. The size of this gap is one factor which determines the stiffness of the spring and hence the response of the head. Since the tape skew error to be corrected is relatively minute, of the order of thousandths of an inch per inch of tape width, a relatively stiff spring and hence a narrow gap is desirable. The stiffness of this spring is also one factor determining the overall stability of the entire servomechanism loop represented by the block diagram of Figure 2.

The servo motor 25 which moves the linkage member 19 up and down to flex spring hinge 17 and thus rotate head 12 operates very much like a moving voice coil speaker. In particular, the servo motor may consist of a permanent magnet 26 having poles 27 and 28 between which a strong magnetic field exists. A stiff paper cylindrical coil form 29 is glued or otherwise fastened about a disc 30 which is in turn secured to linkage member 19 as by screws 31 or which could be integral with member 19. Cylinder 29 projects downward beyond disc 30 and into the gap between poles 27 and 28. A coil 32 is wound about the lower portion of cylindrical coil form 29 and has its ends brought out to terminal strip 33.

When the amplified output of the phase detector is applied to coil 32 by leads (not shown) which may be attached to the posts on terminal strip 33, the reaction of the magnetic field set up by the coil with the field of the permanent magnet causes the rigid assembly including linkage 19 to move up or down along pole 28 according to the polarity and amplitude of the applied signal. The amplitude and direction of the motion resulting from the signal are determined by the well known laws of motor action. The motion of coil 32 is transmitted by linkage 19 to flex spring 17 and thus rotate head 12 in the manner above described.

The correct signal to be applied to coil 32 is derived from the sine waves recorded on tracks A and H which are converted to an electrical output by the two outer channels of head 12, amplified by the playback amplifiers, and applied to the phase detector as shown in the block diagram of Figure 2. A phase detector having an output which is linearly proportional to the deviation from a 90° phase difference of the two sine wave inputs and which is independent of differences in amplitude of the inputs may be constructed in accordance with the schematic diagram of Figure 4.

Figure 4:
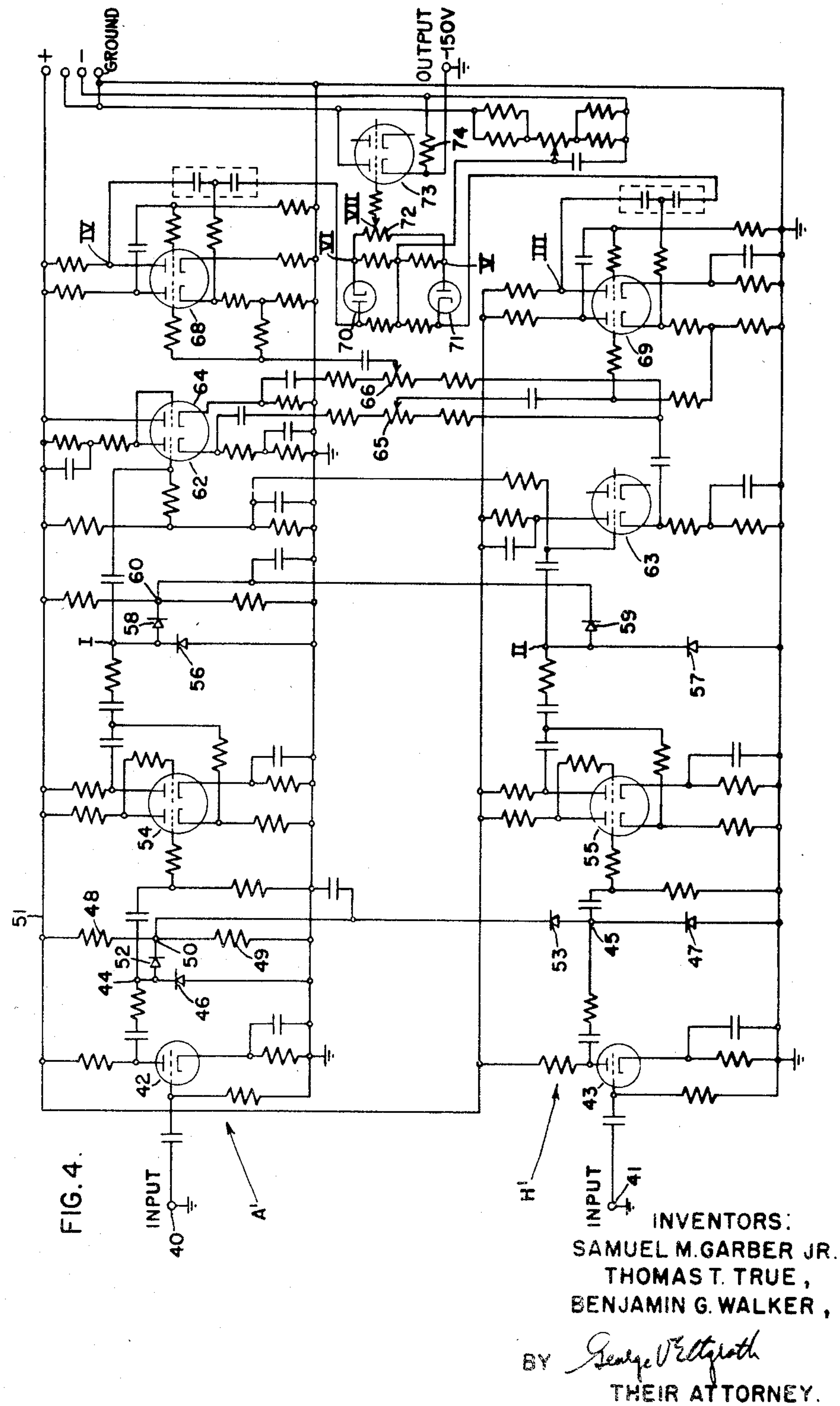
Figure 4 is a schematic diagram of the phase detector used in the servo mechanism loop illustrated in Figure 2.

In Figure 4, two amplifier-clipper channels, A′ and H′ have input terminals 40 and 41 respectively to which the amplified reference signals from tracks A and H may be applied. The input signals are amplified by amplifiers 42 and 43 which have their outputs taken from points 44 and 45 respectively. Points 44 and 45 are each connected to ground through diodes 46 and 47 which serve to clamp the minimum of the output signals to ground potential. Resistors 48 and 49 in channel A′ are connected in series between the positive plate supply line 51 and ground so as to maintain point 50 at a fixed positive potential by voltage divider action. Point 44 is connected to point 50 by diode 52, and point 45 is connected to point 50 by diode 53. Diodes 52 and 53 have polarities such that if the potential of the signal at points 44 or 45 exceeds the potential of fixed point 50, the diodes will conduct and hence clip the signals at a level determined for both the channels by the fixed potential of point 50.

Figure 5:
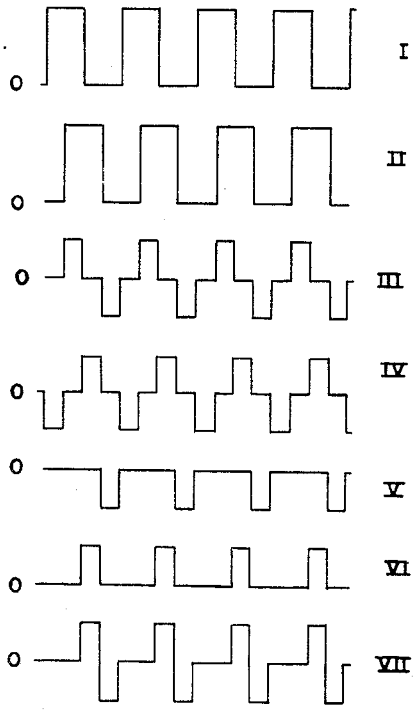
Figure 5 is a diagram of the waveforms at various points in the circuit of Figure 4.

The clipped signal is further amplified by a two stage amplifier 54 in channel A′ and 55 in channel H′ which have outputs at points I and II exhibiting the respective waveforms shown at I and II in Figure 5. These outputs are clamped by diodes 56 and 57 and are clipped by diodes 58 and 59 which are tied to the point 60 of fixed potential as in the previous stage.

Wave form I is applied to the grid of amplifier 62 while wave form II is applied to the grid of amplifier 63. Output is taken from the cathode load resistor of amplifiers 62 and 63 and applied to adding resistor 65. The sum of waveforms I and II is then taken from resistor 65 and applied to the grid of amplifier 69 which produces at point III the output waveform III of Figure 5.

Output is also taken from the anode of amplifier 62 and applied to the grid of cathode follower 64. The phase inversion in amplifier 62 causes the negative of waveform I to appear on the cathode load resistor of amplifier 64 from which it is applied to resistor 66. In effect, the difference between waveform II and waveform I appears at resistor 66.

This difference is applied to the grid of amplifier 68 producing at point IV the output waveform IV, shown in Figure 5.

Waveform IV is applied to the anode of diode 70, while waveform III is applied to the cathode of diode 71. Diode 70 passes only the positive portion of waveform IV and hence waveform VI in Figure 5 will appear at its cathode. Diode 71 passes only the negative portion of waveform III and hence waveform V in Figure 5 will appear at its cathode. Waveforms V and VI are added across resistor 72 producing at point VII waveform VII of Figure 5. Waveform VII is applied to the grid of cathode follower 73 and the output is taken from across its cathode resistor 74.

The waveforms shown in Figure 5 assume that the input signals have a 90° phase difference, in which case the average or D.C. value of waveform VII will be 0 and no signal will be applied to the servomotor 25. When the phase of the input signals differs from 90° the positive and negative portions of waveform VII will not be of the same width. There will then be an average D.C. output the amplitude of which is linearly proportional to the phase deviation of the input signals from 90° over a range of approximately 180° and is independent of difference in amplitude of the input signals, and the polarity of which is determined by the sign of the phase deviation.

Figure 6:
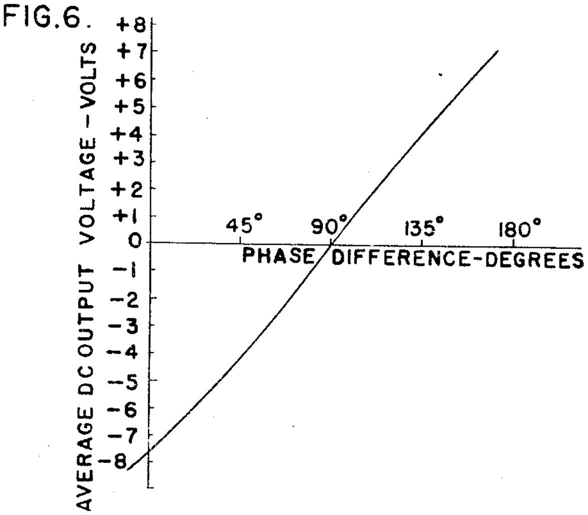
Figure 6 is a graph of the output of the phase detector as a function of the phase difference of input signals.

Figure 6 is a graph of average D.C. output voltage as a function of phase deviations of 15.75 kc. input signals. As shown in Figure 2, this output of the phase detector is applied to the D.C. pre-amplifier and final amplifier and thence to coil 32 of servomotor 25. This causes the servomotor to rotate the head 12 in the manner described above in such fashion as to bring the reference signals recorded on tracks A and H back to a 90° phase relationship. This action in turn assures that the signals played back from all other tracks will also have the same phase relation during playback which they had when they were recorded.

In order to measure the effectiveness of the servo in reducing skew, the output of the skew servo phase detector was applied through an amplifier to a Brush Pen Recorder first with the servo loop open and then with the servo loop closed. Uncorrected tape skew in a precision built plural channel recorder was found to vary over wide limits during a 15 minute run. There was a slow skew over a period of minutes that showed peak time variations of 8 to 12 microseconds across 1½ inches of tape at 100 inches per second. Superimposed on the slow drift were higher frequency components of skew having peak to peak amplitudes varying from one to five microseconds or more.

Another fifteen minute recording with the same recorder and the same tape under the same conditions but with the servo loop closed showed no perceptible slow or long-time skew throughout the run and the peak to peak higher frequency time variations were reduced to within ±0.2 microseconds across the 1½ inches of tape.

While the principles of the invention have now been made clear in an illustrative embodiment, there will be immediately obvious to those skilled in the art many modifications in structure, arrangement, proportions, the elements and components used in the practice of the invention, and otherwise, which are particularly adapted for specific environments and operating requirements, without departing from those principles. The appended claims are, therefore, intended to cover and embrace any such modifications, within the limits only of the true spirit and scope of the invention.

What we claim as new and desire to secure by Letters Patent of the United States is:

1. In combination, a plural channel information storage medium, a plural channel transducing means, means for angularly moving said transducing means in the plane of said medium at a surface adjacent to said head, driving means connected to control the positional angular alignment of said transducing means in said plane with respect to the channels of said storage medium, means to derive an error signal indicating change in said alignment, and means to apply said error signal to actuate said driving means to reduce said error signal.

2. In combination, a recording medium, a transducing head, said head being mounted for pivotal motion in the plane of said medium at a surface adjacent to said head, a servomechanism connected to control the motion of said head, means to derive an error signal indicating change in the angular positional relationship in said plane between said head and said medium, and means to apply said signal to actuate said servomechanism to pivot said head in a direction to reduce said signal.

3. In a plural channel device for magnetically recording and reproducing information, a magnetic recording medium having a plurality of parallel tracks thereon, a transducing head having one channel for each of said plurality of tracks, said head being pivotally mounted for movement in relation to said magnetic medium in the plane of the medium at a surface adjacent to said head, a servomotor connected to control the positional relationship between said head and said tracks, means to detect phase shifts between signals reproduced from at least two of said tracks, and means to apply said detected phase shifts as an error signal to actuate said servomotor to reduce said phase shifts.

4. In a plural channel device for reproducing magnetically recorded information, a magnetic medium having a plurality of parallel tracks thereon, at least two of said tracks having reference signals recorded thereon, a reproducing head having one channel for each of said plurality of tracks, means for mounting said head for motion in the plane of said medium at a surface adjacent to said head, means to derive an error signal from said reference signals, a servomotor connected to control the positional alignment in said plane between said reproducing head and said tracks, and means to apply said error signal to actuate said servomotor to move said head in order to reduce said error signal.

5. Apparatus as in claim 4 wherein said reproducing head is pivotally mounted for motion in the plane of said magnetic medium, and wherein said servomotor comprises, means to generate a fixed magnetic field, a coil movably mounted within said field, and means to transmit the motion of said coil to said pivotally mounted reproducing head.

6. Apparatus as in claim 4 wherein said means to derive an error signal comprises, two amplifier-clipper channels, each channel having a sine wave input derived from said recorded reference signals and a rectangular wave error signal output, means to maintain equality between the amplitudes of the rectangular wave outputs of the two chanels, first means to add the outputs of the two channels to produce a first resultant, second means to subtract the output of one channel from the output of the other channel to produce a second resultant, means to rectify the first and second resultants, and means to linearly add the rectified resultants to produce a final error signal output which is linearly proportional to changes in phase between the sine wave inputs and independent of differences of amplitude between said sine wave inputs.

7. Apparatus as in claim 6 wherein said means to maintain equality between the amplitude of said rectangular wave outputs comprises, a point of fixed potential, a return path from said point to ground, a first diode connected between said point of fixed potential and the point at which output is taken from said first amplifier-clipper channel, a second diode connected between said point of fixed potential and the point at which output is taken from said second amplifier-clipper channel, each of said diodes having a polarity such that they will conduct if the potential of the output of the channel to which they are connected exceeds the potential of said fixed point.

8. A phase detector comprising, two amplifier-clipper channels, each channel having a sine wave input and a rectangular wave output, means to maintain equality between the amplitudes of the rectangular wave outputs of the two channels, first means to add the outputs of the two channels to produce a first resultant, second means to subtract the output of one channel from the output of the other channel to produce a second resultant, means to rectify the first and second resultants, and means to linearly add the rectified resultants to produce a final output linearly proportional to phase shifts between said inputs and independent of differences in amplitude between said inputs.

9. Apparatus as in claim 8 wherein said means to maintain equality between the amplitude of said square wave outputs comprises, a point of fixed potential, a return path from said point to ground, a first diode connected between said point of fixed potential and the point at which output is taken from said first amplifier-clipper channel, a second diode connected between said point of fixed potential and the point at which output is taken from said second amplifier-clipper channel, each of said diodes having a polarity such that they will conduct if the potential of the output of the channel to which they are connected exceeds the potential of said fixed point.

10. In a plural channel device for reproducing magnetically recorded information, a magnetic tape having a plurality of parallel tracks thereon, at least two of said tracks having sine wave reference signals of the same frequency and ninety degrees phase difference recorded thereon, a reproducing head having one channel for each of said tracks, means to pivotally mount said head for motion in the plane of said tape, first and second amplifier-clipper channels to convert said sine wave reference signals to square waves, means to maintain the outputs of said first and second channels at equal amplitude, means to add the outputs of said first and second channels to obtain a first resultant, means to subtract the outputs of said first and second channels to obtain a second resultant, means to linearly add said first and second rectified resultants to produce a direct current output, and means to apply said output to driving means connected to control the positional relationship between said head and said tape.

11. Apparatus as in claim 10 wherein said means to pivotally mount said head comprises an information transducing head, a spring member, means attaching said head to a first end of said spring member, a supporting means, means attaching a second end of said spring member to said supporting means, and means to apply a force to said first end of said spring member.

12. Apparatus as in claim 1 in which said transducing means comprises an information transducing head, and in which said driving means comprise a spring member, means to attach said head to a first end of said spring member, a supporting means, means to attach a second end of said spring member to said supporting means, and actuating means energized by said error signal to apply a force to said first end of said spring member.

References Cited in the file of this patent

UNITED STATES PATENTS

| | | |
|---|---|---|
| 2,709,204 | Holmes | May 24, 1955 |
| 2,751,439 | Burton | June 19, 1956 |
| 2,782,626 | Jochum | Feb. 26, 1957 |